United States Patent [19]

Futakata

[11] Patent Number: 4,765,765
[45] Date of Patent: Aug. 23, 1988

[54] LABEL PRINTER

[75] Inventor: Takashi Futakata, Shizuoka, Japan

[73] Assignee: Tokyo Electric Co., Ltd., Tokyo, Japan

[21] Appl. No.: 930,295

[22] Filed: Nov. 14, 1986

[30] Foreign Application Priority Data

Nov. 21, 1985 [JP] Japan .................. 60-262058

[51] Int. Cl.$^4$ .................. B41J 15/04; B41J 15/16
[52] U.S. Cl. .................. 400/614; 400/613;
400/583; 400/249; 101/288
[58] Field of Search .............. 400/120, 613, 614, 583,
400/583.3; 101/288; 156/361

[56] References Cited

U.S. PATENT DOCUMENTS

| | | | |
|---|---|---|---|
| 3,294,212 | 12/1966 | Gearheart et al. | 400/614 |
| 3,944,455 | 3/1976 | French | 156/361 |
| 4,253,902 | 3/1981 | Yada | 156/361 |
| 4,264,396 | 4/1981 | Stewart | 101/288 |
| 4,569,608 | 2/1986 | Watanabe | 400/208 |
| 4,579,466 | 4/1986 | Sako et al. | 400/613 |
| 4,647,235 | 3/1987 | Sato | 400/120 |
| 4,652,317 | 3/1987 | Seestrom | 101/288 |
| 4,652,330 | 3/1987 | Gerband et al. | 156/361 |
| 4,655,624 | 4/1987 | Kondo et al. | 400/208 |

FOREIGN PATENT DOCUMENTS

| | | | |
|---|---|---|---|
| 64625 | 11/1982 | European Pat. Off. | 400/583.3 |
| 44878 | 3/1980 | Japan | 101/288 |
| 178279 | 10/1984 | Japan | 400/583.3 |
| 184869 | 9/1985 | Japan | 400/613 |
| 2120821 | 12/1983 | United Kingdom | 101/208 |

Primary Examiner—William Pieprz
Attorney, Agent, or Firm—Oblon, Fisher, Spivak, McClelland & Maier

[57] ABSTRACT

The label printer of the present invention comprises a label cassette containing an elongate label sheet and removably loadable in the printer unloadably, a memory for storing print parameters of label formats relative to print contents, and a parameter selection means for detecting the states of a plurality of selective elements incorporated in the label cassette correspondingly to the individual print parameters and selecting a print parameter conforming to the result of such detection. In this structure, mere loading of the label cassette in the printer prescribes the label format relative to the print content that corresponds to the loaded label cassette, thereby facilitating the operation to prescribe the desired label format.

4 Claims, 6 Drawing Sheets

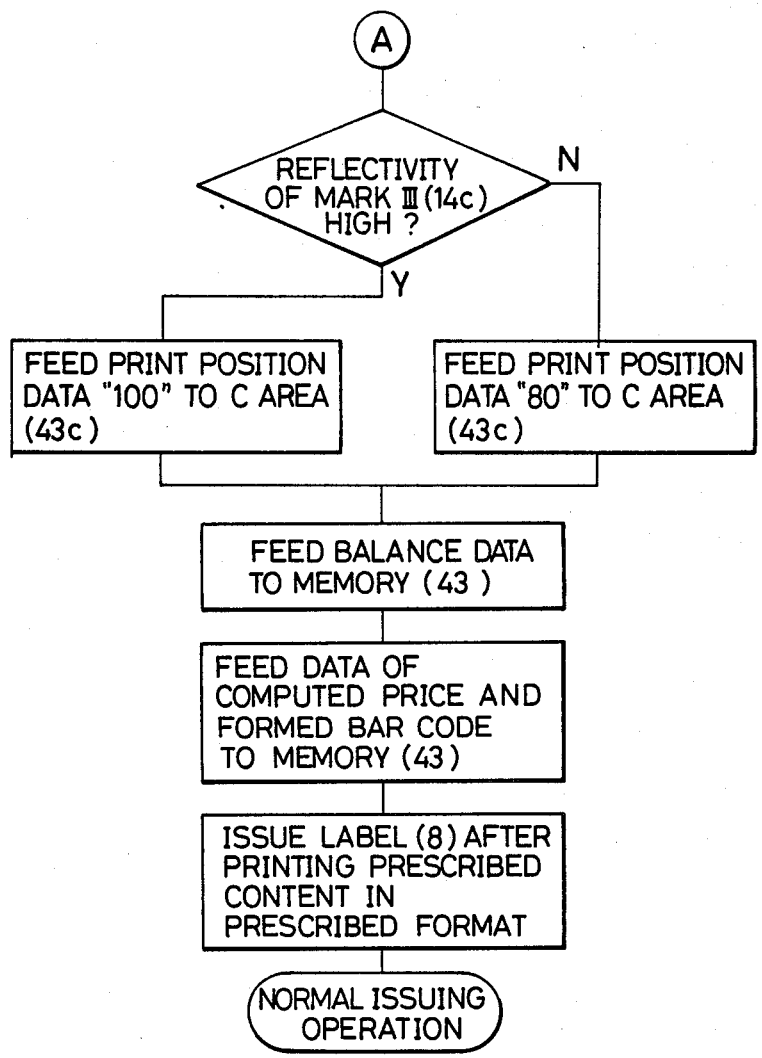

LABEL PRINTER

FIELD OF THE INVENTION

The present invention relates to a label printer so designed as to issue a label after printing predetermined items thereon and, more particularly, to an apparatus for selectively prescribing a label format.

BACKGROUND OF THE INVENTION

In the conventional apparatus of this type known heretofore, there is furnished a capability of issuing a plurality of kinds of labels. Each of such issuable labels is printed according to a preset format related thereto, so that the kinds of required labels correspond in number to such formats. Exemplary contents of the label formats include a bar code and a print position. A desired format is selected by inputting a related parameter through manipulation of keys.

The technical problems existing in such prior art are as follows. For selecting each preset label format, it is necessary to execute a key-input action at each time, and therefore changing the label format becomes troublesome. In addition, the key-input action itself is complicated to eventually increase the intricacy, and in particular it is difficult to preset multiple kinds of formats. Furthermore, means for presetting such formats are not uniform, consequently bringing about more difficulties in the operation.

There is disclosed an exemplary structure in Japanese Patent Application No. 60 (1985)-188821, wherein label sheets and receipt sheets are stored individually in respective cassettes, and such cassettes are selectively loaded in a printer so that printing on a label sheet and printing on a receipt sheet can be automatically switched. According to the above contrivance, an identification mark representing the kind of the contained sheets is put on each cassette, and the mark is detected in the printer upon loading of the cassette, whereby a printing operation is performed in a mode conforming to the result of such detection. Therefore, mere loading of the cassette accomplishes automatic setting of the desired printing mode that corresponds to the sheet used. In such apparatus, however, the advantage is nothing but automatic setting of the type of a sheet for printing, i.e. a desired format relative to the print type, and it is impossible to execute automatic setting of any format with respect to various contents to be printed.

OBJECT OF THE INVENTION

It is an object of the present invention to provide a novel label printer which is capable of setting or prescribing a desired label format with facility relative to the content to be printed.

SUMMARY OF THE INVENTION

For the purpose of achieving the object mentioned above, the present invention comprises a label cassette containing an elongate label sheet that is removably loadable in the printer, a memory for storing print parameters of label formats relative to the contents to be printed, and a parameter selection means for setting or prescribing a desired label format by first detecting the states of a plurality of selective elements disposed in the label cassette correspondingly to the individual print parameters and then selecting one print parameter conforming to the result of such detection. In such a structure, when the label cassette is loaded in the printer, a print parameter conforming to the state of the selective element is selected and set. Consequently, the label format relative to the print content is set or prescribed merely by loading the label cassette in the printer, so that the operation for such prescription can be performed with remarkable facility.

DESCRIPTION OF PREFERRED EMBODIMENTS

Figure 1:
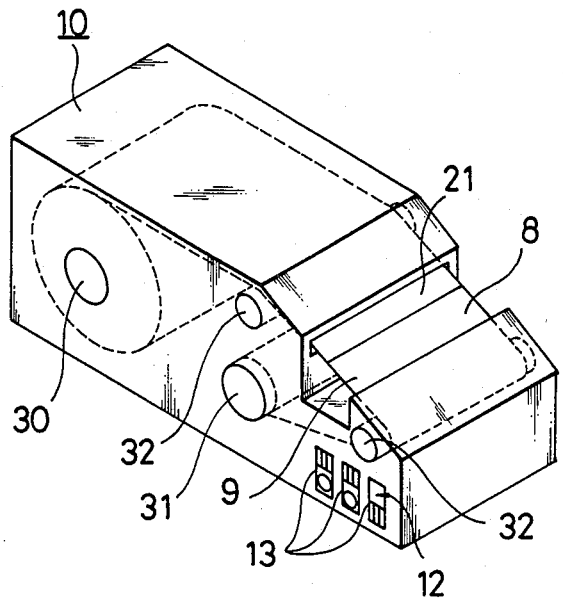
FIG. 1 is a perspective view of a label cassette used in an exemplary embodiment of the present invention.
Figure 2:
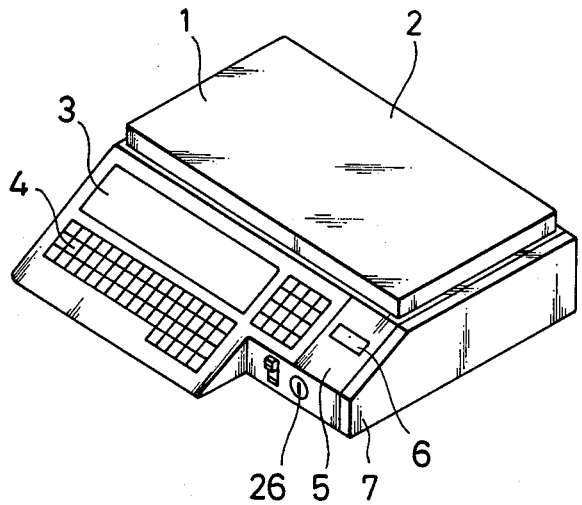
FIG. 2 is a general perspective view of an entire apparatus.
Figure 3:
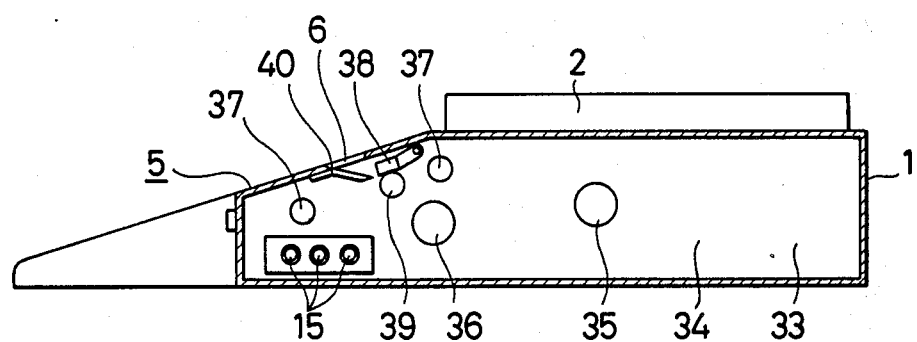
FIG. 3 is a vertical sectional side view of the apparatus shown in FIG. 2.

Hereinafter an exemplary embodiment of the present invention will be described with reference to FIGS. 1 through 7. This embodiment is an apparatus with a label printer incorporated in an electronic charge balance assembly. First, the electronic charge balance assembly 1 has a scale 2 on its top surface. A display 3 and a keyboard 4 are disposed on the front of the balance assembly 1, and a label printer 5 is provided in a lateral region thereof. There is formed a label issuing slot 6 in a front portion of the label printer 5, and a door 7 is attached to one side thereof in an openable and closable manner.

Figure 4:
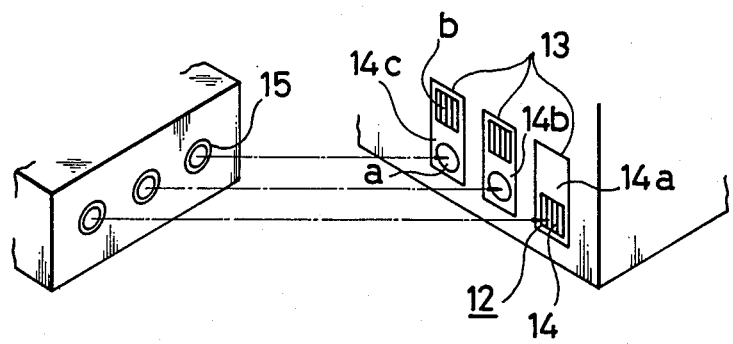
FIG. 4 is a perspective view of a parameter selection means.

Meanwhile, there is provided a label cassette 10 which can be loaded in the label printer 5 unloadably with the door 7 opened. The label cassette 10 is equipped with a rotatable hold tube 30 for winding an elongate label sheet 8 from its one end and holding it, and also a rotatable takeup tube 31 for taking up the other end of the label sheet 8. Furthermore, two guide tubes 32 are disposed rotatably between the hold tube 30 and the takeup tube 31 for guiding the label sheet 8 along a predetermined path. In an intermediate portion between the guide tubes 32, there is formed an opening 9 to expose the label sheet 8 for contact with a thermal printer head. Selective elements 13 partially constituting a parameter selection means 12 are disposed on the exterior of the label cassette 10. As shown in FIG. 4, the selective elements 13 have three selectable marks 14 such as a mark I 14a, a mark II 14b and a mark III 14c. Each of the selectable marks 14 is divided into two regions having a regular reflection surface a and an irregular reflection surface b which are mutually different in optical reflectivity. The regular reflection surface a is composed of a high-reflectivity material, while the irregular reflection surface b is composed of a material that causes diffused reflection of incident light. The irregular reflection surface b is formed to be slidable so as to cover the regular reflection surface a. Therefore, sliding the irregular reflection surface b enables the mark 14 to have two selectable branches. More specifically, the mark I 14a is used for selectively checking if the size of the label 21 is "large" or "small"; the mark II 14b is used for selectively checking if the bar code is composed of 13 digits or 8 digits; and the mark III 14c is used for selectively deciding the print position of the content to be printed.

Now a description will be given of a space for loading the aforesaid label cassette 10 in the label printer 5. Inside the door 7 of the label printer 5, there is formed a cassette housing 34 which is separated from the electronic charge balance assembly 1 by a partition plate 33. A hold shaft 35 fitted into the hold tube 30, a takeup shaft 36 fitted into the takeup tube 31, and guide shafts 37 fitted into the guide tubes 32 are protruding respectively horizontally from the partition plate 33. An unshown driving motor is connected to the takeup shaft 36 to constitute a takeup mechanism. Between the two guide shafts 37, there are disposed a thermal printer head 38 and a platen 39 serving as a printing unit to print data on the labels 21. A strip claw 40 is provided to strip the labels 21 from the label sheet 8 immediately after the data is printed. The thermal printer head 38, the platen 39, and the strip claw 40 are located at suitable positions with respect to the opening 9 formed in the label cassette 10 to expose the label sheet 8 for contact with the thermal printer head 38. In the cassette housing 34, there is disposed a discriminator 15 which partially constitutes the parameter selection means 12 at a position opposite to the selective elements 13 of the loaded label cassette 10. The discriminator 15 is composed of optical sensors.

Figure 5:
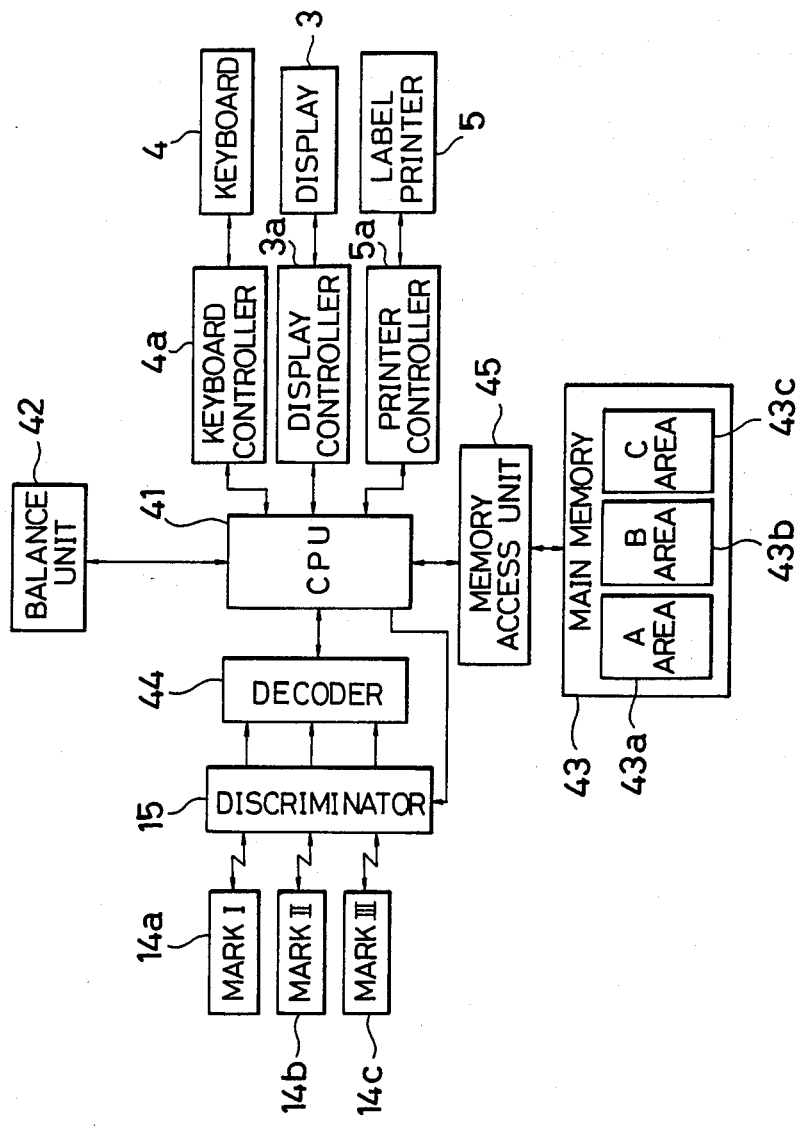
FIG. 5 is a block diagram.

FIG. 5 shows electric connection of the individual components in the electronic charge balance assembly 1 and the label printer 5. To a CPU 41 there are connected a balance unit 42 and a main memory 43 as well as the display 3, the keyboard 4, the label printer 5, and the discriminator 15. In more detail, the display 3 is connected through a display controller 3a, the keyboard 4 through a keyboard controller 4a, the label printer 5 through a printer controller 5a, the discriminator 15 through a decoder 44, and the main memory 43 through a memory access unit 45 to the CPU 41, respectively. The main memory 43 has an A area 43a, a B area 43b, a C area 43c, and other areas.

Denoted by 26 and shown in FIG. 1 is a mode setting switch disposed in a front portion of the electronic charge balance assembly 1.

In the structure mentioned above, the label format conforming to the label cassette 10 is set or prescribed upon loading of the label cassette 10 in the label printer 5. More specifically, during the operation of issuing a label 21, the label format conforming to the state of the selective element 13 in the label cassette 10 loaded at that time is prescribed automatically, and printing is executed on the label 21 in accordance with the prescribed label format.

Figure 6:
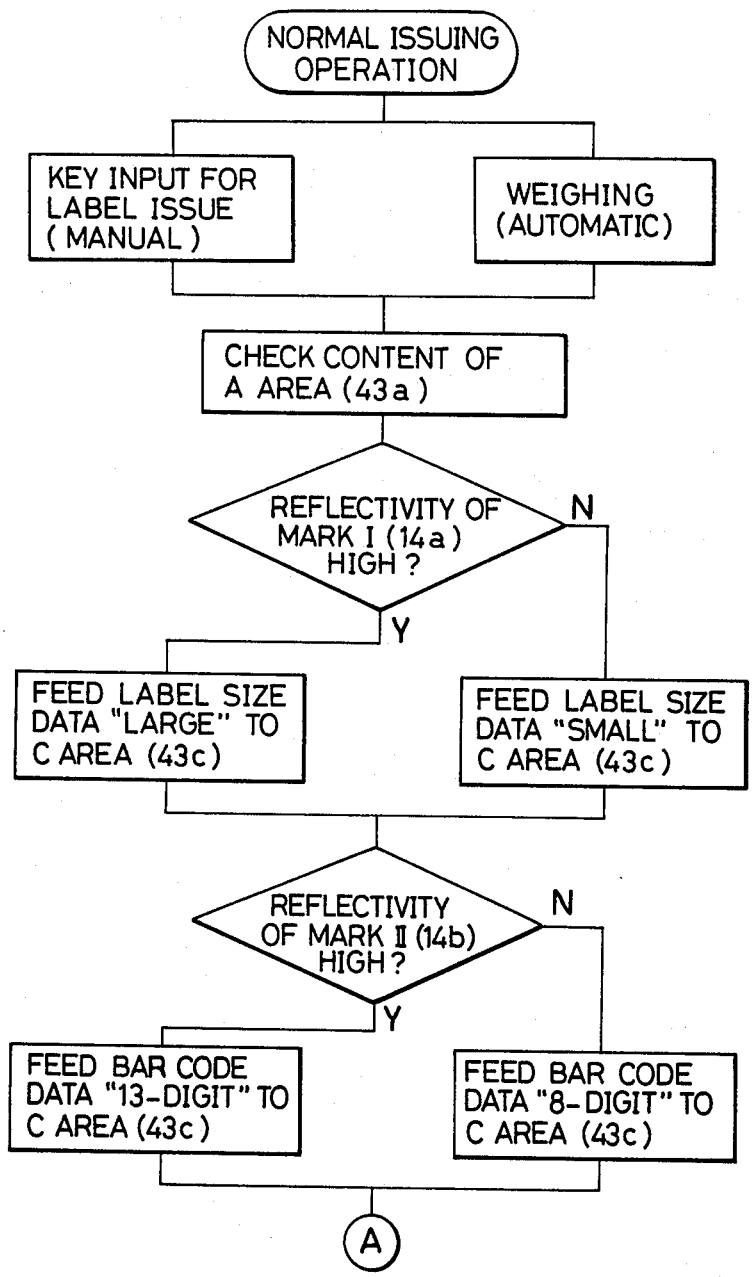
FIG. 6 is a flow chart showing a sequential procedure for a label issuing operation.

The operation of issuing a label 21 will now be described below with reference to FIG. 6.

First, in the discriminator 15, two signals are detected, with respect to one selectable mark 14 formed in the label cassette 10, due to the difference between the light reflectivities of the regular reflection surface a and the irregular reflection surface b in the selectable mark 14. The detection data relative to each selectable mark 14 is fed to the A area 43a in the main memory 43, and a binary signal corresponding to the detection data is selected.

When this binary signal is fed to the B area 43b in response to a command from the CPU 41, a print parameter is set in the B area 43b. In this case, the balance data and so forth in the balance unit 42 are also fed to the main memory 43.

When a key-input step is so executed on the keyboard 4 as to designate issuance of a label 21, the content of the A area 43a is checked. That is, the binary signal representing the switchover state of the selectable mark 14 in the A area 43a is detected with respect to the mark I 14a, mark II 14b, and mark III 14c in this sequence.

The print parameter selected in the B area 43b in accordance with the result of such detection is then fed, in response to a command from the CPU 41, to the C area 43c, which serves as a buffer relative to the print format, whereby a label format is established. More specifically, due to the difference of the reflectivity of the mark I 14a, the print parameter relative to the size of the label 21 is fed to the C area 43c. If the reflectivity is high, the size of the label 21 is decided to be "large". Also due to the difference of the reflectivity of the mark II 14b, the print parameter relative to the number of digits of the bar code to be printed on the label 21 is fed to the C area 43c. If the reflectivity is high, the bar code is decided to be "13-digit". Furthermore, due to the difference of the reflectivity of the mark III 14c, the print parameter relative to the print position of items to be printed on the label 21 is fed to the C area 43c. Thus, a buffer for the specific label format is established in the C area 43c.

Subsequently, the data of contents to be printed on the label 21 are inputted sequentially to other areas in the main memory 43, including balance data from the balance unit 42 and data representing the price of an article and the content of a bar code. The latter data representing the price of an article and the content of a bar code are computed by the CPU 41 on the basis of the balance data and the key-input data from the keyboard 4.

Figure 7:
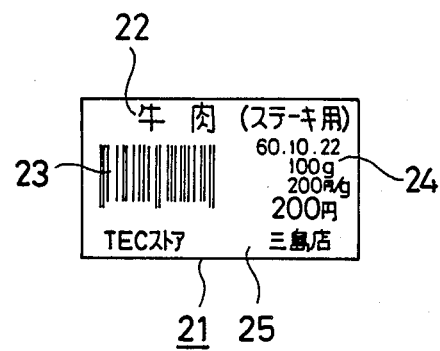
FIG. 7 is a plan view of a label.

After the print format and the print content are thus prescribed, such information is fed to the printer controller 5a via a data bus. Subsequently, the prescribed content is printed on the label 21 in accordance with the prescribed format, and then the printed label 21 is issued from the slot 6. FIG. 7 illustrates an exemplary label 21 issued. In this example, the prescribed format on the label 21 includes an article name column 22, a bar code column 23, a data column 24, and an address column 25 as illustrated, and required items are printed in the individual columns respectively.

In this manner, when the label cassette 10 is loaded in the label printer 5, the selective elements 13 are placed opposite to the discriminator 15 so that the prescribed content can be read out, whereby the label format is selectively decided, and then printing is performed in accordance with such label format.

Meanwhile, since the selective elements 13 have a plurality of selectable marks 14 corresponding to a plurality of kinds of formats, it is possible to simultaneously prescribe a plurality of kinds of formats. In this embodiment, for example, formats settable with respect to the print contents by the parameter selection means 12 include print positions for an article name column 22 and a bar code column 23, and also another format for the number of digits of a bar code. Furthermore, regarding formats for other print contents which are entirely different from the foregoing ones, similar setting is still possible by the parameter selection means 12. More specifically, in the format relative to the size of the label 21 in this embodiment, the subject to be decided is not limited to the label size alone and may be the kind of the item to be printed. Thus, mere loading of the label cassette 10 in the label printer 5 achieves automatic prescription of a label format which is a combination of plural formats corresponding to the states of the selective elements 13 in the label cassette 10, thereby facilitating the operation for such prescription. Therefore, a plurality of label cassettes 10 are prepared, and the respective selectable marks 14 of the selective elements 13 in such cassettes 10 are previously so determined as to conform to individual label formats to be set. Then, when any desired label cassette 10 is loaded in the label printer 5, a desired label format can be immediately selected out of plural kinds of the label formats. Furthermore, the label format can be changed with facility merely by switching the selectable marks 14, hence widening the range of prescription of the label formats.

Figure 8:
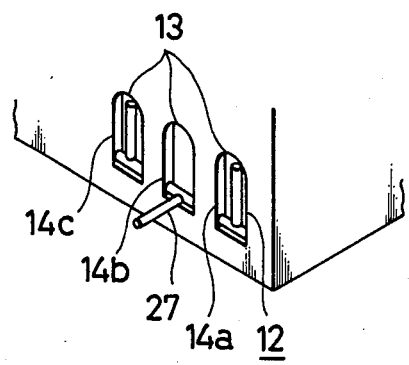
FIG. 8 is a perspective view of a modified selective element.

FIG. 8 illustrates a modification of the selective element 13. In this example, three tiltable rods 27 constitute the selective elements 13. A parameter selection means 12 is fabricated in the label printer 5 by providing an unshown discriminator which is positioned opposite to such rods 27 and executes a switching action when pressed by the projecting rod 27. The discriminator 15 may be of another type having an optical switching function to detect the presence of the projecting tiltable rod 27 when it intercepts a light path.

What is claimed is:

1. a label printer comprising:
   (a) a label cassette containing an elongate label sheet having a plurality of labels removably stuck thereon, said label cassette being removably located in said label printer;
   (b) a takeup mechanism disposed in said label printer for taking up said elongate label sheet contained in said label cassette;
   (c) a printing unit disposed in said label printer for sequentially printing each one of said plurality of labels stuck onto said elongate label sheet;
   (d) a memory incorporated in said label printer for storing, as a plurality of print parameters, label formats relative to print contents; and
   (e) a parameter selection means comprising:
      (i) a plurality of selective elements each one of which has a portion that has at least two light-reflective states, said plurality of selective elements being incorporated in said label cassette, each one of said light-reflective states of each one of said plurality of selective elements corresponding to one of said plurality of print parameters, and
      (ii) discriminator means capable of detecting the light-reflective state of said portion of each one of said selective elements and selecting a print parameter stored in said memory conforming to the results of such detection, thereby prescribing the desired label format for printing, said discriminator means being incorporated in said label printer externally of said label cassette.

2. The label printer as defined in claim 1, wherein:
   (a) said memory has an A area for storing a binary signal corresponding to the output signal of said parameter selection means, a B area for storing the label formats as a plurality of print parameters, and a C area used as a data buffer and
   (b) the output signal of said discriminator means is convertered into a binary signal in said A area, then the print parameter in said B area is selected on the basis of said binary signal, and the buffer relative to the selected label format is formed in said C area.

3. The label printer as defined in claim 1, wherein the light reflectivity of said portion of each one of said plurality of selective elements is changed by the use of a slide plate.

4. A label printer as defined in claim 1, wherein said takeup mechanism is disposed in said label cassette.

* * * * *